United States Patent
Jung et al.

(10) Patent No.: US 11,395,378 B2
(45) Date of Patent: Jul. 19, 2022

(54) INDUCTION HEATING DEVICE HAVING IMPROVED INTERFERENCE NOISE REMOVAL FUNCTION AND POWER CONTROL FUNCTION

(71) Applicant: LG Electronics Inc., Seoul (KR)

(72) Inventors: Kyung Hoon Jung, Seoul (KR); Dooyong Oh, Seoul (KR); Seungbok Ok, Seoul (KR); Byeong Wook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 16/838,225

(22) Filed: Apr. 2, 2020

(65) Prior Publication Data
US 2020/0359468 A1  Nov. 12, 2020

(30) Foreign Application Priority Data
May 7, 2019 (KR) .......................... 10-2019-0053332

(51) Int. Cl.
*H05B 3/76* (2006.01)
*H05B 6/06* (2006.01)
(Continued)

(52) U.S. Cl.
CPC .............. *H05B 6/062* (2013.01); *H02M 1/14* (2013.01); *H02M 1/34* (2013.01); *H02M 1/44* (2013.01);
(Continued)

(58) Field of Classification Search
CPC .... H02M 1/14; H02M 3/1584; H02M 7/5387; H02M 7/4815; H02M 1/346; H02M 7/06;
(Continued)

(56) References Cited

U.S. PATENT DOCUMENTS

| 6,115,273 | A | * | 9/2000 | Geissler | ............... B23K 9/1056 363/89 |
| 2010/0170893 | A1 | | 7/2010 | Breuninger et al. | |
| 2011/0228564 | A1 | * | 9/2011 | Uruno | ..................... H02M 1/08 363/17 |
| 2012/0103971 | A1 | * | 5/2012 | Oh | ......................... H05B 6/062 219/465.1 |
| 2012/0132647 | A1 | * | 5/2012 | Beverly | ................. H05B 6/062 219/624 |

(Continued)

FOREIGN PATENT DOCUMENTS

| EP | 3737209 | 11/2020 |
| JP | H09275674 | 10/1997 |

(Continued)

OTHER PUBLICATIONS

Extended European Search Report in European Appln. No. 20172683.3, dated Oct. 20, 2020, 5 pages.
EP Office Action in European Appln. No. 20172683.3, dated Jul. 5, 2021, 4 pages.

*Primary Examiner* — Jared Fureman
*Assistant Examiner* — Esayas G Yeshaw
(74) *Attorney, Agent, or Firm* — Fish & Richardson P.C.

(57) ABSTRACT

An induction heating device includes a first resonance circuit comprising a first working coil and a first resonance capacitor, a first inverter electrically connected to the first resonance circuit and configured to perform a first switching operation to thereby apply a first resonance current to the first working coil, a first group of snubber capacitors that are configured to be electrically connected to the first inverter, the first group of snubber capacitors comprising a first snubber capacitor and a second snubber capacitor, and a first relay configured to selectively connect the first group of snubber capacitors to the first inverter.

19 Claims, 9 Drawing Sheets

(51) Int. Cl.
*H02M 1/14* (2006.01)
*H02M 1/34* (2007.01)
*H02M 1/44* (2007.01)
*H02M 3/158* (2006.01)
*H02M 7/06* (2006.01)
*H05B 1/02* (2006.01)
*H05B 6/04* (2006.01)

(52) U.S. Cl.
CPC .......... *H02M 3/1584* (2013.01); *H02M 7/06* (2013.01); *H05B 1/0266* (2013.01); *H05B 6/04* (2013.01); *H02M 1/346* (2021.05)

(58) Field of Classification Search
CPC ............ H02M 1/34; H02M 1/44; H05B 6/04; H05B 6/062; H05B 1/0266; Y02B 70/10
See application file for complete search history.

(56) References Cited

U.S. PATENT DOCUMENTS

| | | | |
|---|---|---|---|
| 2012/0261405 A1* | 10/2012 | Kurose | H05B 6/44 219/620 |
| 2016/0323937 A1 | 11/2016 | Falcon et al. | |
| 2018/0063891 A1* | 3/2018 | Imai | H02M 7/5387 |
| 2019/0064249 A1* | 2/2019 | Yoshida | G01R 31/2608 |
| 2019/0200441 A1* | 6/2019 | Zhu | H02M 3/33569 |
| 2021/0028703 A1* | 1/2021 | Iwazaki | H02M 1/4225 |

FOREIGN PATENT DOCUMENTS

| | | |
|---|---|---|
| JP | 2007080752 | 3/2007 |
| JP | 2009176566 | 8/2009 |
| JP | 2018007310 | 1/2018 |
| KR | 1020170075913 | 7/2017 |

* cited by examiner

RELATED ART

RELATED ART

RELATED ART

INDUCTION HEATING DEVICE HAVING IMPROVED INTERFERENCE NOISE REMOVAL FUNCTION AND POWER CONTROL FUNCTION

CROSS-REFERENCE TO RELATED APPLICATION

The present disclosure claims priority to and the benefit of Korean Patent Application No. 10-2019-0053332, filed on May 7, 2019, the disclosure of which is incorporated herein by reference in its entirety.

TECHNICAL FIELD

The present disclosure relates to an induction heating device having an improved interference noise removal function and output control function.

BACKGROUND

Various types of cooking apparatuses may be used to heat food in homes and restaurants. For example, gas ranges use gas as fuel to heat food. In some examples, cooking devices may heat an object such as a cooking vessel, for example, a pot, with electricity instead of gas.

Methods for heating an object via electricity may be classified into a resistive heating method and an induction heating method. In the electrical resistive method, heat may be generated based on current flowing through a metal resistance wire or a non-metallic heating element, such as silicon carbide, and the heat may be transmitted to the object (e.g., the cooking vessel) through radiation or conduction to heat the object. In the induction heating method, eddy current may be generated in the object made of metal based on a magnetic field that is generated around the coil based on a high-frequency power having a predetermined magnitude applied to the coil.

In some cases, where an operating frequency of each of vessels may be set based on output of each of vessels when a plurality of vessels are to be heated, interference noise may occur due to difference in the operation frequencies of vessels. In some cases, where the operation frequencies of vessels are within an audio frequency range, a user may experience unpleasant feeling due to noise.

FIG. 1 shows an induction heating device in related art.

Referring to FIG. 1, the induction heating device may use amplitude modulation to prevent generation of high-frequency current in an audible frequency band to reduce interference noise. For example, the induction heating device may perform a noise reduction algorithm of the vessel based on information obtained by a laser Doppler vibrometer (LDV) that measurers a magnetic field.

In some cases, the induction heating device may minimize a difference in the operating frequency of vessels to minimize the interference noise generated when a plurality of vessels are heated. In some cases, output of an induction heating device with respect to vessels may not be properly generated because working coils corresponding to the vessels having different heating temperatures are driven based on a similar operation frequency. In particular, generation of low output of the induction heating device may be difficult, and thus the induction heating device may be controlled to be in an on-state or an off-state based on the generated low output of the induction heating device. In some cases, the induction heating device would have difficulty in continuously generating output based on the on/off control, which may result in noise based on the induction heating device being driven (i.e., operated) and the induction heating device not being driven (i.e., not operated).

In some cases, the induction heating device may use a method of setting the same operating frequency of vessels (i.e., using a fixed frequency).

In some cases, where the induction heating device uses a fixed frequency, the induction heating device may adjust a pulse width (i.e., duty) of a control signal provided to an inverter that performs switching operation. For example, the pulse width may be adjusted in a range of 10 to 50%.

FIGS. 2 and 3 are graphs showing examples of duty adjustment in induction heating devices in related art.

The upper graphs in FIGS. 2 and 3 show waveforms of load voltages VL (e.g., voltages applied to working coils) and load current (IL) (e.g., current flowing through working coils) based on duty of a driving signal applied to a working coil being less than 35%. The lower graphs in FIGS. 2 and 3 show waveforms of switching element currents IS (i.e., current flowing through switching elements provided in inverters) based on duty of driving signal applied to a working coil being less than 35% (i.e., in low output sections). FIG. 2 may correspond to a case where an inverter is electrically connected to a snubber capacitor that reduces an amount of a surge voltage and inrush current, FIG. 3 may correspond to a case where an inverter is not electrically connected to a snubber capacitor.

Referring to FIG. 2, based on the duty of the control signal being less than 35% (i.e., in a low output section), a discharge loss may occur by the snubber capacitor (i.e., a loss occurring due to discharge current is indicated on the waveform of the switching element current IS), thereby increasing an amount of heat generated by the switching element. As shown in FIG. 2, the snubber capacitor may reduce the amount of surge voltage and inrush current of the inverter.

Referring to FIG. 3, the discharge loss may not occur due to absence of the snubber capacitor even based on the duty of the control signal being less than 35% (i.e., in the low output section). In some cases, the surge voltage and the inrush current of the inverter may be difficult to be reduced by removing the snubber capacitor.

SUMMARY

The present disclosure describes an induction heating device capable of removing interference noise generated when a plurality of vessels are heated.

The present disclosure also describes an induction heating device capable of performing continuous output operation in a wide output range.

The objects of the present disclosure are not limited to the above-mentioned objects, and other objects and advantages of the present disclosure which are not mentioned can be understood by the following description and more clearly understood by the implementations of the present disclosure. It will also be readily apparent that the objects and advantages of the present disclosure can be implemented by means described in claims and a combination thereof.

According to one aspect of the subject matter described in this application, an induction heating device includes a first resonance circuit comprising a first working coil and a first resonance capacitor, a first inverter electrically connected to the first resonance circuit and configured to perform a first switching operation to thereby apply a first resonance current to the first working coil, a first group of snubber capacitors that are configured to be electrically connected to the first inverter, the first group of snubber capacitors comprising a first snubber capacitor and a second snubber capacitor, and a first relay configured to selectively connect the first group of snubber capacitors to the first inverter.

Implementations according to this aspect may include one or more of the following features. For example, the induction heating device may further include a second group of snubber capacitors that are electrically connected to the first inverter, the second group of snubber capacitors comprising a third snubber capacitor and a fourth snubber capacitor that are each different from the first snubber capacitor and the second snubber capacitor. For instance, in some examples, a capacitance value of each of the first snubber capacitor and the second snubber capacitor may be greater than a capacitance value of each of the third snubber capacitor and the fourth snubber capacitor. In some examples, the capacitance value of the first snubber capacitor may be equal to the capacitance value of the second snubber capacitor, and the capacitance value of the third snubber capacitor may be equal to the capacitance value of the fourth snubber capacitor.

In some implementations, the first inverter may include a first switching element and a second switching element that are configured to perform the first switching operation. The first snubber capacitor may be configured to be electrically connected in parallel to the first switching element through the first relay, the second snubber capacitor may be configured to be electrically connected in parallel to the second switching element through the first relay. The third snubber capacitor may be electrically connected in parallel to the first switching element, and the fourth snubber capacitor may be electrically connected in parallel to the second switching element.

In some examples, the first switching element may have a first end that is electrically connected to a first end of the first snubber capacitor and a first end of the third snubber capacitor, and a second end that is electrically connected to a first end of the second switching element, a first end of the first relay, a second end of the third snubber capacitor, and a first end of the fourth snubber capacitor. A second end of the first relay may be electrically connected to a second end of the first snubber capacitor, a first end of the second snubber capacitor, and the first resonance capacitor. A second end of the second snubber capacitor, a second end of the fourth snubber capacitor, and a second end of the second switching element may be electrically connected to the first working coil and to a ground.

In some examples, the first resonance capacitor may have a first end that is electrically connected to the second end of the first relay, and a second end that is electrically connected to the first working coil.

In some implementations, the induction heating device may further include a second resonance circuit comprising a second working coil that is different from the first working coil and a second resonance capacitor that is different from the first resonance capacitor, a second inverter electrically connected to the second resonance circuit and configured to perform a second switching operation to thereby apply a second resonance current to the second working coil, a rectifier that is configured to convert alternating current (AC) power supplied from a power supply into direct current (DC) power and that is configured to supply the DC power to at least one of the first inverter or the second inverter, and a controller that is configured to control operation of each of the first inverter, the second inverter, and the first relay. The first inverter may be configured to perform the first switching operation based on the DC power supplied by the rectifier, and the second inverter is configured to perform the second switching operation based on the DC power supplied by the rectifier.

In some examples, the controller may be configured to, based on operating the first inverter and the second inverter simultaneously, control the first relay to block connection between the first inverter and the first group of snubber capacitors, and based on the first relay blocking the connection between the first inverter and the first group of snubber capacitors, provide (i) a first control signal to the first inverter to thereby control a first output of the first working coil and (ii) a second control signal to the second inverter to thereby control a second output of the second working coil, where the first control signal and the second control signal have a same fixed frequency. The controller may be configured to adjust (i) a pulse width of the first control signal to thereby control the first output of the first working coil and (ii) a pulse width of the second control signal to thereby control the second output of the second working coil.

In some examples, the controller may be configured to, based on operating only the first inverter among the first inverter and the second inverter, control the first relay to connect the first inverter and the first snubber capacitor, based on the first relay connecting the first inverter and the first snubber capacitor to each other, provide a first control signal to the first inverter to thereby control an output of the first working coil, and adjust a frequency of the first control signal to thereby control the output of the first working coil.

In some implementations, the induction heating device may further include a first semiconductor switch electrically connected to the first working coil and configured to turn on and turn off the first working coil, a second semiconductor switch electrically connected to the second working coil and configured to turn on and turn off the second working coil, and a DC link capacitor electrically connected in parallel to the rectifier and configured to reduce variation of the DC power converted by the rectifier.

In some implementations, each of the first inverter and the second inverter is a half-bridge type inverter.

In some implementations, the first inverter may include a first switching element and a second switching element that are configured to perform the first switching operation, where the first snubber capacitor is configured to be electrically connected in parallel to the first switching element through the first relay, and the second snubber capacitor is configured to be electrically connected in parallel to the second switching element through the first relay.

In some implementations, the first switching element may have a first end that is electrically connected to a first end of the first snubber capacitor, and a second end that is electrically connected to a first end of the second switching element and a first end of the first relay. A second end of the first relay may be electrically connected to a second end of the first snubber capacitor, a first end of the second snubber capacitor, and the first resonance capacitor, and a second end of the second snubber capacitor and a second end of the second switching element may be electrically connected to the first working coil and to a ground.

In some examples, the first resonance capacitor may have a first end that is electrically connected to a second end of the first relay, and a second end that is electrically connected to the first working coil.

In some implementations, the induction heating device may further include a second resonance circuit comprising a second working coil that is different from the first working coil and a second resonance capacitor that is different from the first resonance capacitor, a second inverter electrically connected to the second resonance circuit and configured to perform a second switching operation to thereby apply a second resonance current to the second working coil, a rectifier that is configured to convert alternating current (AC) power supplied by a power supply into direct current (DC) power and that is configured to supply the DC power to at least one of the first inverter or the second inverter, and a controller that is configured to control operation of each of the first inverter, the second inverter, and the first relay. The first inverter may be configured to perform the first switching operation based on the DC power supplied by the rectifier, and the second inverter is configured to perform the second switching operation based on the DC power supplied by the rectifier.

In some examples, the controller may be configured to, based on operating the first inverter and the second inverter simultaneously, control the first relay to block connection between the first inverter and the first snubber capacitor, and based on the first relay blocking the connection between the first inverter and the first snubber capacitor, provide (i) a first control signal to the first inverter to thereby control a first output of the first working coil and (ii) a second control signal to the second inverter to thereby control a second output of the second working coil, where the first control signal and the second control signal may have a same fixed frequency. The controller is configured to adjust (i) a pulse width of the first control signal to thereby control the first output of the first working coil and (ii) a pulse width of the second control signal to thereby control the second output of the second working coil.

In some implementations, the controller may be configured to, based on operating only the first inverter among the first inverter and the second inverter, control the first relay to connect the first inverter and the first snubber capacitor to each other, and based on the first relay connecting the first inverter and the first snubber capacitor to each other, provide a first control signal to the first inverter to thereby control an output of the first working coil. The controller may be configured to adjust a frequency of the first control signal to thereby control the output of the first working coil.

In some implementations, the induction heating device may further include a first semiconductor switch electrically connected to the first working coil and configured to turn on and turn off the first working coil, a second semiconductor switch electrically connected to the second working coil and configured to turn on and turn off the second working coil, and a DC link capacitor electrically connected in parallel to the rectifier and configured to reduce variation of the DC power converted by the rectifier.

In some implementations, the induction heating device may remove the interference noise generated when the plurality of vessels are heated by controlling a pulse width in a fixed frequency condition without an additional device such as LDV, thereby saving cost of the additional device, and improving user satisfaction and convenience by removing the interference noise.

In some implementations, the induction heating device may prevent overheating of the switching element and may output power in a wide output range without an additional circuit. A continuous output operation may be performed over a wide output range, thereby improving product performance and reliability.

Hereinafter, a specific effect of the present disclosure, further to the above-mentioned effect, is described together while describing a specific matter for implementing the present disclosure.

DETAILED DESCRIPTION

Figure 1:
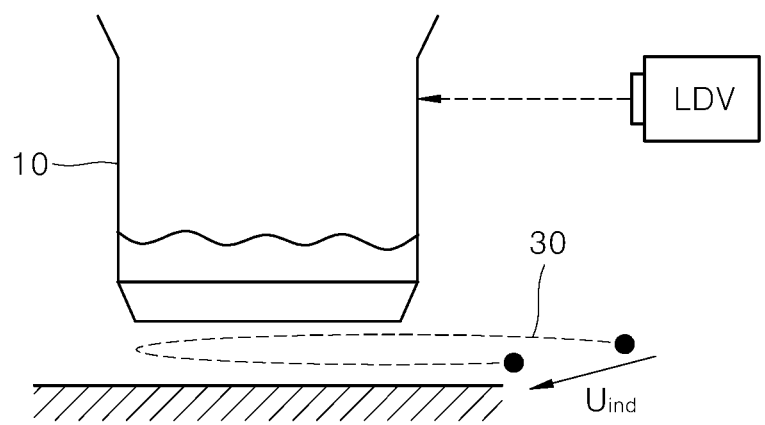
FIG. 1 shows an induction heating device in related art.

The above mentioned objects, features, and advantages of the present disclosure are described in detail with reference to the accompanying drawings, so that those skilled in the art to which the present disclosure pertains may easily implement the technical idea of the present disclosure. In the description of the present disclosure, when it is determined that the detailed description of the known technology related to the present disclosure may obscure the gist of the present disclosure, the detailed description thereof is omitted. Hereinafter, one or more implementations of the present disclosure are described in detail with reference to the accompanying drawings. A same reference numeral in the drawings is used to indicate same or similar components.

An induction heating device according to the present disclosure is described below with reference to FIGS. 4 to 7.

Figure 4:
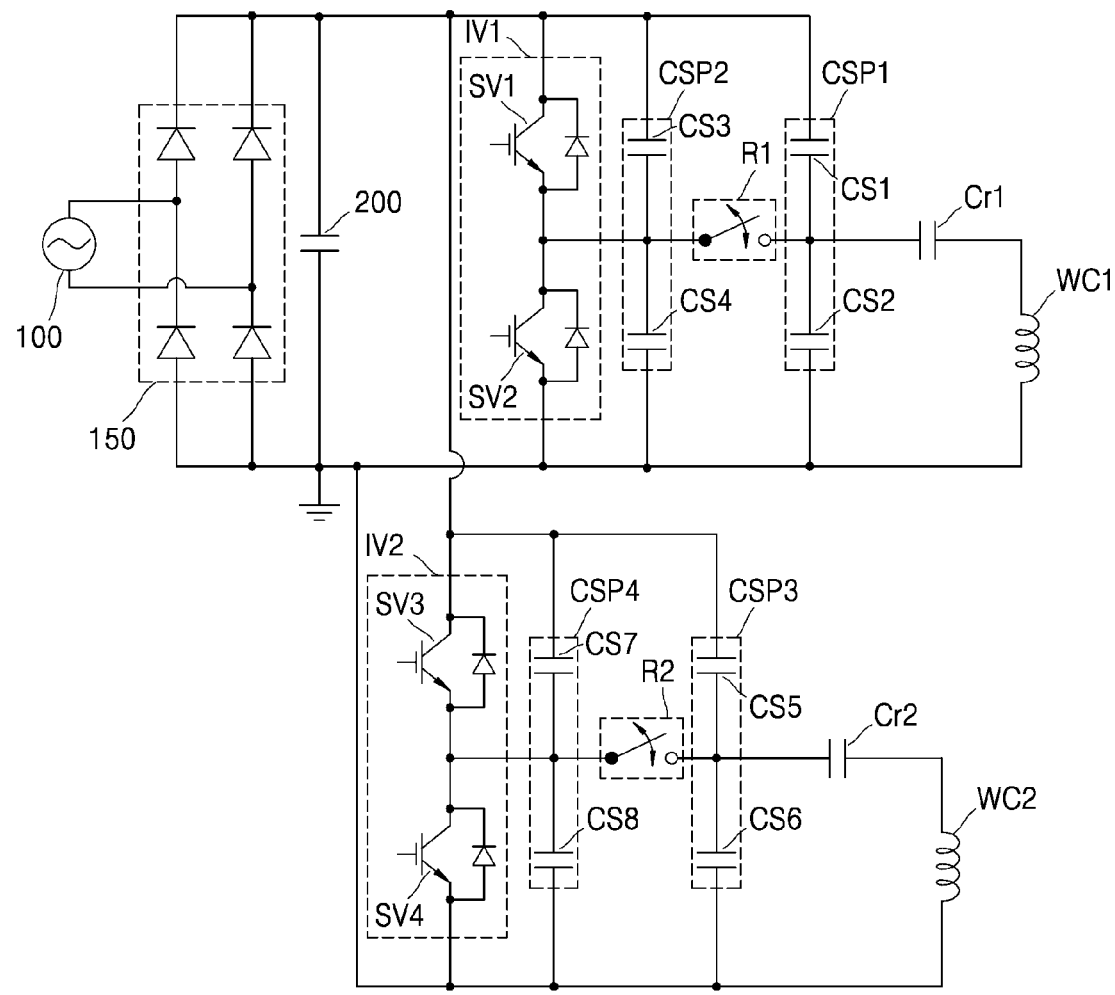
FIG. 4 is a circuit diagram showing an example induction heating device according to the present application.
Figure 5:
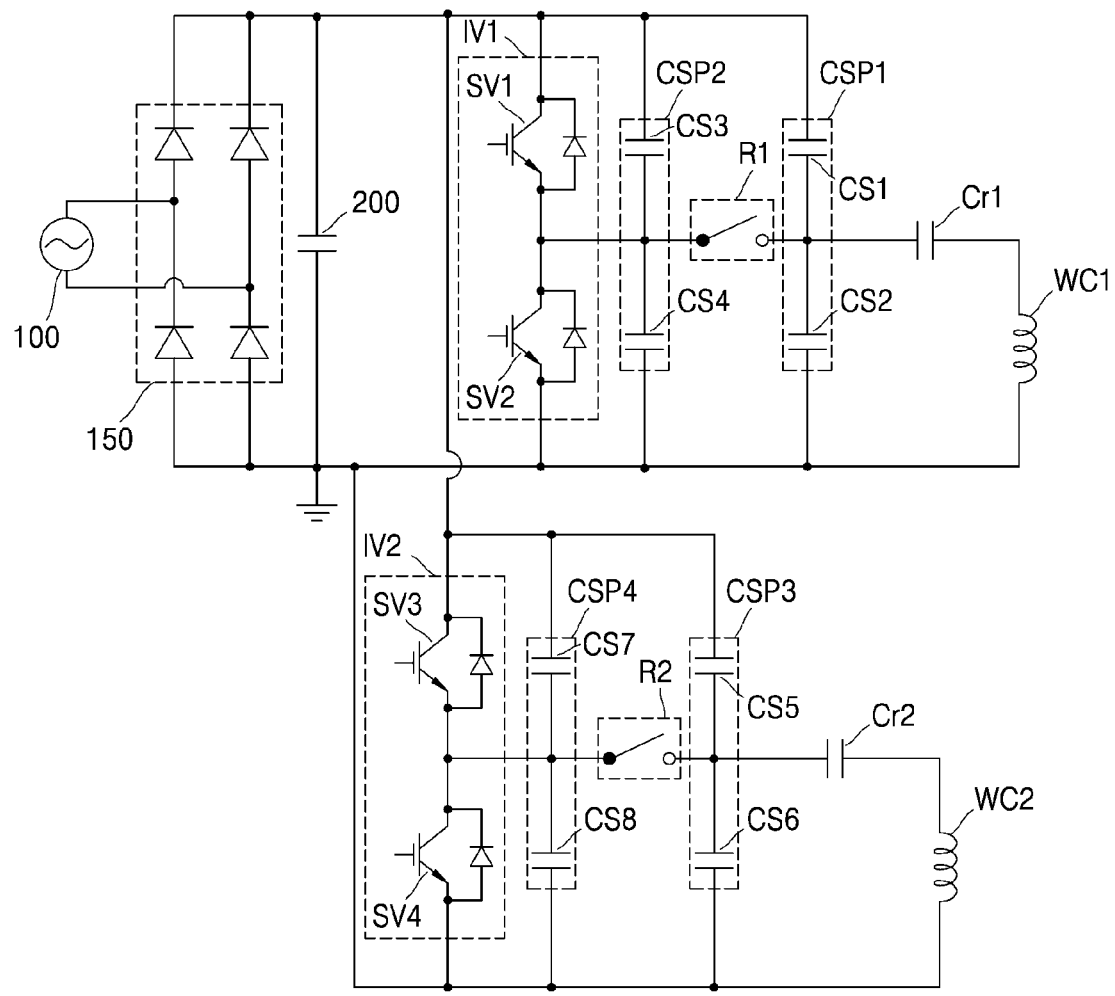
FIG. 5 is a circuit diagram showing an example relay switching method for the hearing device in FIG. 4.
Figure 6:
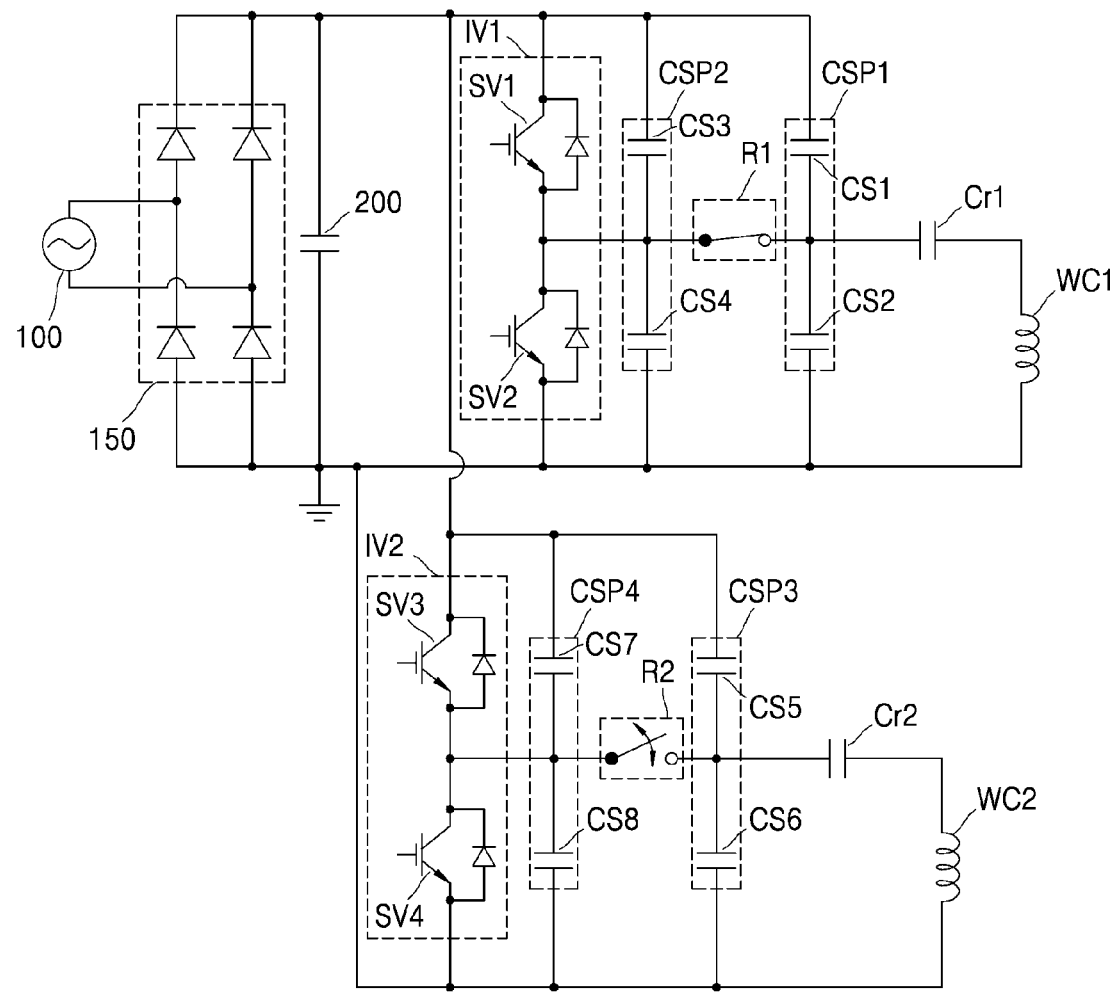
FIG. 6 is a circuit diagram showing another example of a relay switching method for the heating device in FIG. 4.
Figure 7:
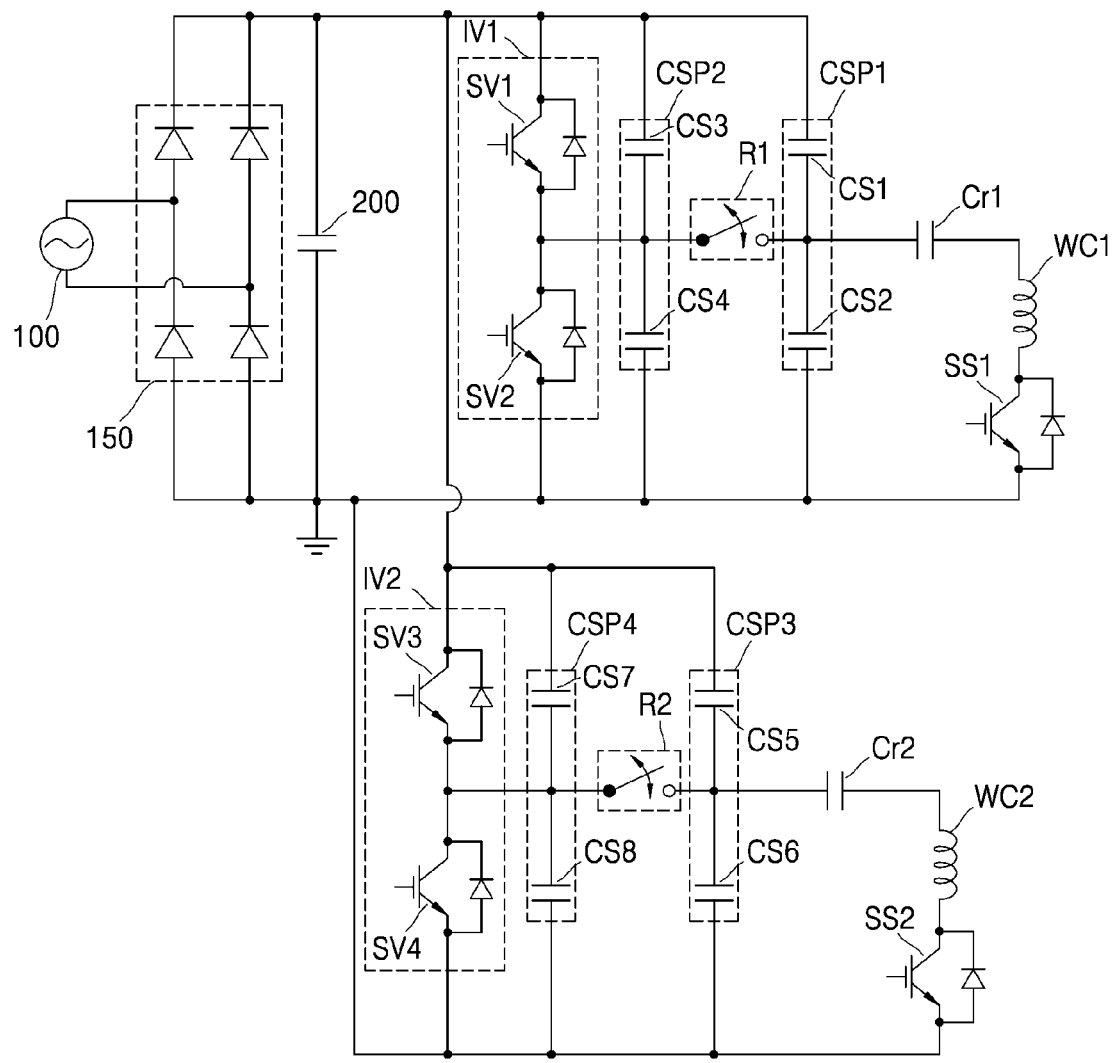
FIG. 7 is a circuit diagram showing a zone-free type induction heating device as shown in FIG. 4.

FIG. 4 is a circuit diagram showing an example induction heating device. FIG. 5 is a circuit diagram showing an example of a relay switching method for the heating device shown in FIG. 4. FIG. 6 is a circuit diagram showing another example of the relay switching method for the heating device shown in FIG. 4. FIG. 7 is a circuit diagram showing a zone-free type induction heating device as shown in FIG. 4.

Referring to FIG. 4, an induction heating device 1 includes a power supply 100, a rectifier 150, a direct current (DC) link capacitor 200, a first inverter IV1 and a second inverter IV2, a first snubber capacitor portion CSP1 to a fourth snubber capacitor portion CSP4, a first resonance capacitor Cr1 and a second resonance capacitor Cr2, a first working coil WC1 and a second working coil WC2, and a first relay R1 and a second relay R2.

In some examples, the induction heating device 1 may further include a controller and an input interface.

The controller may control the operation of various types of components (e.g., the first inverter IV1 and second inverter IV2, the first relay R1 and the second relay R2, and the like) of the induction heating device 1. In some examples, the input interface may be or include a module that inputs a heating intensity or a driving time of the induction heating device desired by a user, and may be variously implemented with a physical button or a touch panel and may receive input from users to provide the input to the controller. The controller may control the operations of the first inverter IV1 and second inverter IV2 and the first relays R1 and second relay R2 based on the input provided by the input interface. For example, the controller may include an electric circuit, a microprocessor, a computer, a communication device, or the like.

Details of the input interface are omitted and details of the controller are described below.

In some examples, a number of some components (e.g., a number of inverters, working coils, relays, and the like) of the induction heating device shown in FIG. 4 may be changed.

In some implementations, the power supply 100 may output alternating current (AC) power.

In some examples, the power supply 100 may output the AC power and provide the rectifier 150 with the AC power. For example, the power supply 100 may be a commercial power supply.

The rectifier 150 may convert the AC power supplied by the power supply 100 into a direct current (DC) power and may supply the DC power to at least one of the first inverter IV1 and the second inverter IV2. The rectifier 150 may include one or more diodes.

In some examples, the rectifier 150 may rectify the AC power supplied by the power supply 100 and may convert the AC power into DC power.

In some examples, the DC power rectified by the rectifier 150 may be provided to a DC link capacitor 200 (i.e., a smoothing capacitor) connected in the rectifier 150 electrically in parallel, and the DC link capacitor 200 may reduce ripple of the DC power.

In some examples, the DC link capacitor 200 may be electrically connected in parallel to the rectifier 150. In some examples, the DC link capacitor 200 may have a first end applied with a voltage (i.e., a DC voltage) corresponding to the DC power and a second end that is connected to or corresponds to the ground.

In some examples, the DC power rectified by the rectifier 150 may be provided to a filter rather than the DC link capacitor 200, and the filter may remove an AC component remaining in the DC power.

For example, in the induction heating device 1, the DC power rectified by the rectifier 150 is provided to the DC link capacitor 200.

The first inverter IV1 may be electrically connected to a first resonance circuit (i.e., a circuit region including a first working coil WC1 and a first resonance capacitor Cr1) and may apply the resonance current to the first working coil WC1 through switching operation.

In some examples, the first inverter IV1 may have a form of half-bridge, and the switching operation may be controlled by the controller described above. That is, the first inverter IV1 may perform switching operation of the first inverter IV1 based on a switching signal (i.e., a control signal and also referred to as "a gate signal") provided by the controller. For example, a half-bridge type inverter may include two switching elements and two capacitors, and a full-bridge type inverter may include four switching elements.

In some examples, the first inverter IV1 may include two switching elements SV1 and SV2 that perform switching operation based on the control signal, and the two switching elements SV1 and SV2 may be alternately turned on and turned off based on the control signal provided by the controller.

For example, when the first switching element SV1 is turned on based on the control signal, the second switching element SV2 is turned off based on the control signal. In some cases, when the first switching element SV1 is turned off based on the control signal, the second switching element SV2 may be turned on based on the control signal. In some examples, the switching elements SV1 and SV2 may include a transistor, metal oxide semiconductor field effect transistor (MOSFET), insulated-gate bipolar transistor (IGBT), a diode, or the like.

In some examples, high-frequency AC (i.e., resonant current) may be generated by the switching operation of the two switching elements SV1 and SV2, and the generated high-frequency AC may be applied to the first working coil WC1.

The control signals applied to the switching elements SV1 and SV2 may be complementary to each other. For example, the pulse width of the control signal provided to the first switching element SV1 may be complementary to the pulse width of the control signal provided to the second switching element SV2.

For example, based on the duty (i.e., pulse width) of the control signal applied to the first switching element SV1 being 50%, the duty of the control signal applied to the second switching element SV2 may be 50%, and based on the duty of the control signal applied to the first switching element SV1 being 30%, the duty of the control signal applied to the second switching element SV2 may be 70%.

In some examples, the first inverter IV1 may be electrically connected to a first snubber capacitor portion CSP1 including a first snubber capacitor CS1 and a second snubber capacitor CS2 and a second snubber capacitor portion CSP2 including a third snubber capacitor CS3 and a fourth snubber capacitor CS4.

In some examples, the first switching element SV1 may have a first end electrically connected to a first end of each of the first snubber capacitor CS1 and the third snubber capacitor CS3, and a second end of the first switching element SV1 and a first end of the second switching element SV2 may be electrically connected to a second end of the third capacitor CS3 and a first end of the fourth snubber capacitor CS4, and a first end of the first relay R1.

In some examples, a second end of the first snubber capacitor CS1 and a first end of the second snubber capacitor CS2 may be electrically connected to the first resonance capacitor Cr1, a second end of the first relay R1, and a second end of the second snubber capacitor CS2 and a second end of the fourth snubber capacitor CS4, and a second end of the second switching element SV2 may be electrically connected to the first working coil WC1 and the ground.

In some examples, the first relay R1 may be selectively opened and closed to electrically connect or disconnect the first inverter IV1 to and from the first snubber capacitor portion CSP1, and the first inverter IV1 and the second snubber capacitor portion CSP2 remain electrically connected to each other regardless of switching operation of the first relay R1. Details thereof are described below.

The second inverter IV2 may be electrically connected to a second resonance circuit (i.e., a circuit region including the second working coil WC2 and the second resonance capacitor Cr2) and may apply a resonance current to the second working coil WC2 through switching operation.

In some examples, the second inverter IV2 may have a form of half-bridge, and the switching operation of the second inverter IV2 may be controlled by the controller described above. That is, the second inverter IV2 may perform the switching operation based on a switching signal (i.e., a control signal and also referred to as "a gate signal") provided by the controller.

In some examples, the second inverter IV2 may include two switching elements SV3 and SV4 that perform a switching operation based on the control signal, and the two switching elements SV3 and SV4 may be alternately turned on and turned off based on the control signal provided by the controller.

For example, in some cases, where the third switching element SV3 is turned on based on the control signal, the fourth switching element SV4 may be turned off based on the control signal and, in some cases, where the third switching element SV3 is turned off based on the control signal, the fourth switching element SV4 may be turned on based on the control signal.

In some examples, high frequency AC (i.e., resonance current) may be generated by the switching operations of the two switching elements SV3 and SV4, and the generated high-frequency AC may be applied to the second working coil WC2.

The control signals applied to the switching elements SV3 and SV4 may be complementary to each other. That is, a pulse width of the control signal provided to the third switching element SV3 may be complementary to a pulse width of the control signal provided to the fourth switching element SV4.

For example, in some cases, where the duty (i.e., pulse width) of the control signal applied to the third switching element SV3 being 50%, the duty of the control signal applied to the fourth switching element SV4 is 50%, and, in some cases, where the duty of the control signal applied to the third switching element SV3 being 30%, the duty of the control signal applied to the fourth switching element SV4 may be 70%.

In some examples, the second inverter IV2 may be electrically connected to a third snubber capacitor portion CSP3 including a fifth snubber capacitor CS5 and a sixth snubber capacitor and a fourth snubber capacitor portion CSP4 including a seventh snubber capacitor CS7 and a eighth snubber capacitor CS8.

In some examples, the third switching element SV3 may have a first end electrically connected to a first end of each of the fifth snubber capacitor CS5 and the seventh snubber capacitor CS7, and a second end of the third switching element SV3 and a first end of the fourth switching element SV4 may be electrically connected to a second end of the seventh snubber capacitor CS7, a first end of the eighth snubber capacitor CS8, and a first end of a second relay R2. In some examples, a second end of the fifth snubber capacitor CS5 and a first end of the sixth snubber capacitor CS6 may be electrically connected to the second resonance capacitor Cr2 and a second end of the second relay R2, and a second end of the sixth snubber capacitor CS6, a second end of the eighth snubber capacitor CS8, and a second end of the fourth switching element SV4 may be electrically connected to the second working coil WC2 and the ground.

In some examples, the second relay R2 is selectively opened and closed to electrically connect or disconnect the second inverter IV2 to and from the third snubber capacitor CSP3, and the second inverter IV2 and the fourth snubber capacitor CSP4 remain electrically connected to each other regardless of the switching operation of the second relay R2. Details of the above configuration are described below.

The first snubber capacitor portion CSP1 may be selectively electrically connected to the first inverter IV1 through a first relay R1 and may include the first snubber capacitor CS1 and the second snubber capacitor CS2.

In some examples, the first snubber capacitor portion CSP1 may include the first snubber capacitor CS1 and the second snubber capacitor CS2. The first snubber capacitor CS1 may be selectively connected to the first switching element SV1 electrically in parallel through the first relay R1 and the second snubber capacitor CS2 is selectively connected to the second switching element SV2 electrically in parallel through the first relay R1.

In some examples, a second end of the first snubber capacitor CS1 and a first end of the second snubber capacitor CS2 are electrically connected to a second end of the first relay R1, and a second end of the first switching element SV1 and a first end of the second switching element SV2 may be electrically connected to a first end of the first relay R1. Therefore, the first snubber capacitor CS1 and the second snubber capacitor CS2 may be selectively electrically connected to the first inverter IV1 through the first relay R.

In some examples, the first snubber capacitor CS1 and second snubber capacitor CS2 are provided to control and reduce inrush current or transient voltage generated by the switching elements SV1 and SV2 corresponding to the first snubber capacitor CS1 and the second snubber capacitor CS2, respectively. In some cases, the first snubber capacitor CS1 and the second snubber capacitor CS2 may be used to remove electromagnetic noise.

The second snubber capacitor portion CSP2 may be electrically connected to the first inverter IV1 and may include a third snubber capacitor CS3 and a fourth snubber capacitor CS4.

In some examples, the second snubber capacitor portion CSP2 may include a third snubber capacitor CS3 connected to the first switching element SV1 electrically in parallel and a fourth snubber capacitor CS4 connected in parallel to the second switching element SV2 electrically in parallel.

In some examples, a second end of the third snubber capacitor CS3 and a first end of the fourth snubber capacitor CS4 may be electrically connected to a second end of the first switching element SV1, a first end of the second switching element SV2, and a first end of the first relay R1. Accordingly, the third snubber capacitor CS3 and the fourth snubber capacitor CS4 may be electrically connected to the first inverter IV1 regardless of the switching operation of the first relay R.

In some examples, the third snubber capacitor CS3 and the fourth snubber capacitor CS4 are provided to control and reduce inrush current or transient voltage generated by the switching elements SV1 and SV2 corresponding to the third snubber capacitor CS3 and the fourth snubber capacitor CS4, respectively. In some cases, the third snubber capacitor CS3 and the fourth snubber capacitor CS4 may be used to remove the electromagnetic noise.

In some examples, a capacitance value (e.g., 33 nF) of each of the first snubber capacitor CS1 and the second snubber capacitor CS2 may be greater than a capacitance value (e.g., 1 to 2 nF) of each of the third snubber capacitor CS3 and the fourth snubber capacitor CS4.

In contrast to the first snubber capacitor CS1 and the second snubber capacitor CS2, the third snubber capacitor CS3 and the fourth snubber capacitor CS4 remains electrically connected to the first inverter IV1 regardless of the switching operation of the first relay R1.

Accordingly, when the snubber capacitor is removed to reduce discharge loss of the snubber capacitor, the third snubber capacitor CS3 and the fourth snubber capacitor CS4 having less capacitance values are maintained without change, and the first snubber capacitor CS1 and the second snubber capacitor CS2 having greater capacitance values are removed, thereby reducing loss caused by the inrush current or the transient voltage.

The third snubber capacitor portion CSP3 may be selectively electrically connected to the second inverter IV2 through the second relay R2 and may include a fifth snubber capacitor CS5 and a sixth snubber capacitor CS6.

In some examples, the third snubber capacitor portion CSP3 may include a fifth snubber capacitor CS5 and a sixth snubber capacitor CS6 and the fifth snubber capacitor CS5 may be selectively connected to the third switching element SV3 electrically in parallel through the second relay R2 and the sixth snubber capacitor CS6 may be selectively connected in parallel to the fourth switching element SW electrically in parallel through the second relay R2.

In some examples, a second end of the fifth snubber capacitor CS5 and a first end of the sixth snubber capacitor CS6 may be electrically connected to a second end of the second relay R2, and a second end of the third switching element SV3 and a first end of the fourth switching element SW may be electrically connected to a first end of the second relay R2. Accordingly, the fifth snubber capacitor CS5 and the sixth snubber capacitor CS6 may be selectively electrically connected to the second inverter IV2 through the second relay R2.

In some examples, the fifth snubber capacitor CS5 and the sixth snubber capacitor CS6 are provided to control and reduce inrush current or the transient voltage generated by the switching elements SV3 and SV4 corresponding to the fifth snubber capacitor CS5 and the sixth snubber capacitor CS6, respectively. In some cases, the fifth snubber capacitor CS5 and the sixth snubber capacitor CS6 may be used to remove the electromagnetic noise.

The fourth snubber capacitor portion CSP4 may be electrically connected to the second inverter IV2 and may include the seventh snubber capacitor CS7 and the eighth snubber capacitor CS8.

In some examples, the fourth snubber capacitor portion CSP4 may include a seventh snubber capacitor CS7 connected to the third switching element SV3 electrically in parallel and an eighth snubber capacitor connected to the fourth switching element SV4 electrically in parallel.

In some examples, a second end of the seventh snubber capacitor CS7 and a first end of the eighth snubber capacitor CS8 are electrically connected to a second end of the third switching element SV3, a first end of the fourth switching element SV4, and a first end of the second relay R2. Thus, the seventh snubber capacitor CS7 and the eighth snubber capacitor CS8 may be electrically connected to the second inverter IV2 regardless of the switching operation of the second relay R.

In some examples, the seventh snubber capacitor CS7 and the eighth snubber capacitor CS8 are provided to control and reduce the inrush current or the transient voltage generated by the switching elements SV3 and SV4 corresponding to the seventh snubber capacitor CS7 and the eighth snubber capacitor CS8, respectively. In some cases, the seventh snubber capacitor CS7 and the eighth snubber capacitor CS8 may be used to remove the electromagnetic noise.

In some examples, a capacitance value (e.g., 33 nF) of each of the fifth snubber capacitor CS5 and sixth snubber capacitor CS6 may be greater than a capacitance value (e.g., 1 to 2 nF) of each of the seventh snubber capacitor CS7 and the eighth snubber capacitor CS8.

In contrast to the fifth snubber capacitor CS5 and the sixth snubber capacitor CS6, the seventh snubber capacitor CS7 and the eighth snubber capacitor CS8 maintain electrically connected to the second inverter IV2 regardless of the switching operation of the second relay R2.

Accordingly, when the snubber capacitor is removed to reduce the discharge loss of the snubber capacitor, the seventh snubber capacitor CS7 and the eighth snubber capacitor CS8 having less capacitance values are maintained without change, and the fifth snubber capacitor CS5 and the sixth snubber capacitor CS6 having greater capacitance values are removed, thereby reducing the loss caused by the inrush current or the transient voltage.

The first working coil WC1 may receive a resonance current from the first inverter IV1.

In some examples, the first working coil WC1 may have a first end electrically connected to the first resonance capacitor Cr1, and may have a second end of the first working coil WC1 electrically connected to a second end of the DC link capacitor 200 (i.e., the ground).

In some examples, an eddy current may be generated between the first working coil WC1 and an object (e.g., an object such as a cooking vessel) based on an AC having high frequency applied from the first inverter IV1 to the first working coil WC1 to heat an object based on the eddy current.

The second working coil WC2 may receive a resonance current from the second inverter IV2.

In some examples, the second working coil WC2 may have a first end electrically connected to the second resonance capacitor Cr2, and the second working coil WC2 may have a second end electrically connected to a second end of the DC link capacitor 200 (i.e., the ground).

In some examples, an eddy current may be generated between the second working coil WC2 and the object (e.g., an object such as a cooking vessel) based on an AC having high frequency applied from the second inverter IV2 to the second working coil WC2 to heat an object based on the eddy current.

The first resonance capacitor Cr1 may be electrically connected to the first working coil WC1.

In some examples, the first resonance capacitor Cr1 may be connected to the first working coil WC1 electrically in series, and may form a first resonance circuit with the first working coil WC1. That is, the first resonance capacitor Cr1 may have a first end electrically connected to a second end of the first relay R1, and may have a second end of the first resonance capacitor Cr1 electrically connected to the first working coil WC1.

In the case of the first resonance capacitor Cr1, based on voltage applied, by the switching operation of the first inverter IV1, to the first resonance capacitor Cr1, the first resonance capacitor Cr1 resonates. In some examples, when the first resonance capacitor Cr1 resonates, an amount of current flowing through the first working coil WC1 electrically connected to the first resonance capacitor Cr1 increases.

Through this process, the eddy current is induced to the object disposed above the first working coil WC1 electrically connected to the first resonance capacitor Cr1.

The second resonance capacitor Cr2 may be electrically connected to the second working coil WC2.

In some examples, the second resonance capacitor Cr2 may be connected to the second working coil WC2 electrically in series, and may form a second resonance circuit with the second working coil WC2. That is, the second resonance capacitor Cr2 may have a first end electrically connected to a second end of the second relay R2 and may have a second end of the second resonance capacitor Cr2 electrically connected to the second working coil WC2.

In the case of the second resonance capacitor Cr2, based on voltage applied by the switching operation of the second inverter IV2 to the second resonance capacitor Cr2, the second resonance capacitor Cr2 resonates. In some examples, when the second resonance capacitor Cr2 resonates, an amount of current flowing through the second working coil WC2 electrically connected to the second resonance capacitor Cr2 increases.

Through this process, the eddy current is induced to the object disposed above the second working coil WC2 electrically connected to the second resonance capacitor Cr2.

The first relay R1 may be selectively opened and closed to electrically connect or disconnect the first inverter IV1 to or from the first snubber capacitor CSP1 and may be controlled by the controller described above.

In some examples, in the case of the first relay R1, the first relay R1 may have a first end electrically connected to a second end of the first switching element SV1, a first end of the second switching element SV2, a second end of the third snubber capacitor CS3, and a first end of the fourth snubber capacitor and may have a second end of the first relay R1 electrically connected to a second end of the first snubber capacitor CS1 and a first end of the second snubber capacitor CS2.

Details of the selective opening and closing operation of the first relay R1 are described below.

The second relay R2 may selectively opened and closed to electrically connect or disconnect the second inverter IV2 to or from the third snubber capacitor portion CSP3, and may be controlled by the controller described above.

In some examples, the second relay R2 may have a first end of the second relay R2 electrically connected to a second end of the third switching element SV3, a first end of the fourth switching element SV4, a second end of the seventh snubber capacitor CS7, and a first end of the eighth snubber capacitor and may have a second end of the second relay R2 electrically connected to a second end of the fifth snubber capacitor CS5 and a first end of the sixth snubber capacitor CS6.

Details of the selective opening and closing operation of the second relay R2 are described below.

In some examples, the induction heating device 1 may also perform a function for transmitting wireless power based on the above-described configurations and features.

For example, power may be wirelessly supplied and is applied to a plurality of electronic devices. Electronic devices that use a technology for transmitting wireless power are charged by simply placing the electronic devices on a charging pad without connecting the electronic device to an additional charge connector. The electronic devices that transmit the wireless power may not require a wired cord or a charger, thereby improving portability of electronic devices and reducing a size and a weight of electronic devices.

The technology for transmitting the wireless power may use an electromagnetic induction method using a coil, a resonance method using resonance, and a radio wave radiation method in which electrical energy is converted into a microwave and the converted microwave is transmitted. The electromagnetic induction method uses electromagnetic induction between a primary coil (e.g., a working coils WC1 and WC2) provided in a device that transmits wireless power and a secondary coil provided in a device that receives wireless power to transmit the power.

The induction heating method of the induction heating device 1 has the substantially same principle as the technology for transmitting the wireless power using electromagnetic induction in that the object is heated by electromagnetic induction.

The induction heating device 1 may perform a function for transmitting the wireless power, as well as induction heating. Further, an induction heating mode or a wireless power transmission mode may be controlled by the controller. Thus, the function for inductively heating the object or the function for transmitting the wireless power may be selectively performed as necessary.

The induction heating device 1 may include the above-described configurations and features. A relay switching method of the induction heating device 1 is described with reference to FIGS. 5 and 6.

FIG. 5 shows a first inverter IV1 and a second inverter IV2 operated simultaneously (i.e., the first working coil WC1 and the second working coil WC2 simultaneously driven).

In some cases, where the first inverter IV1 and the second inverter IV2 operate simultaneously, the controller may provide the first inverter IV1 and the second inverter IV2 with the first control signal and the second control signal having the same fixed frequency to control output of the first working coil WC1 and the second working coil WC2.

The controller may adjust the pulse width of the first control signal to adjust the output of the first working coil WC1, and may adjust the pulse width of the second control signal to adjust the output of the second working coil WC2.

Accordingly, interference noises generated when a plurality of vessels are heated (i.e., when a plurality of working coils are driven) may be suppressed.

In some examples, the induction heating device 1 may generate high output at the fixed frequency. In order to reduce the output of the induction heating device 1 as well as maintaining the fixed frequency, the pulse widths (i.e., duty) of the first control signal and the second control signals (i.e., signals provided by the controller) provided to the first inverter IV1 and the second inverter IV2, respectively, may be adjusted (e.g., in a range of 10 to 50%).

Figure 2:
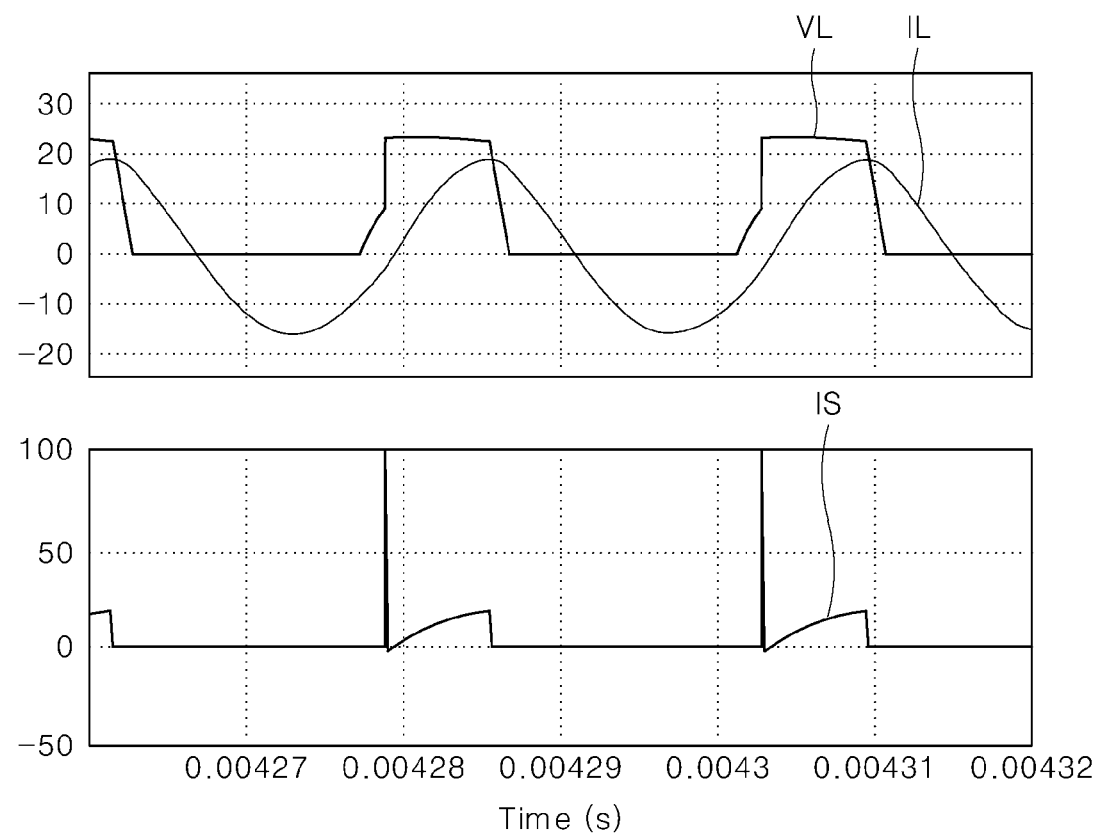
FIGS. 2 and 3 are graphs showing examples of duty adjustment in induction heating devices in related art.
Figure 3:
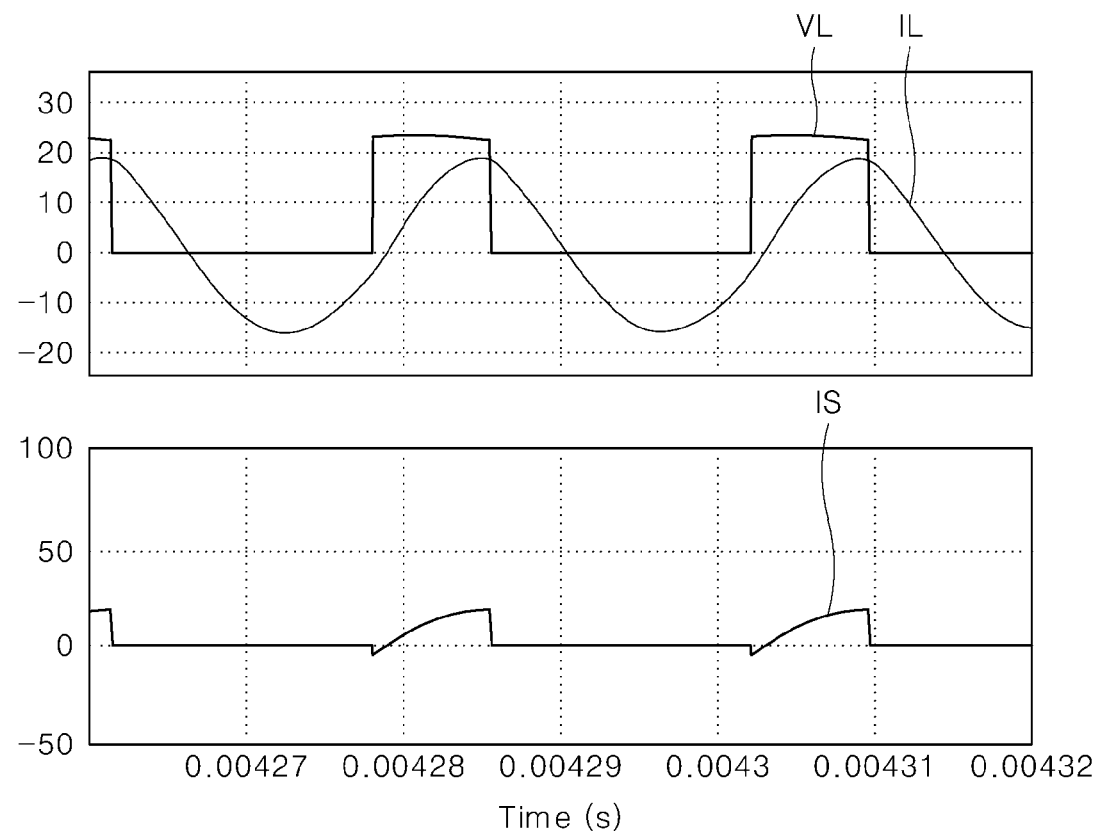

That is, as described above with reference to FIGS. 2 and 3, in some cases, where the duty is less than 35% (in some examples, the duty value may be one example, but is not limited thereto) (i.e., a low power section), a load voltage VL (see FIG. 2) is changed to be lagged in phase compared to the load current IL (see FIG. 2), thereby causing a loss in the switching element current (i.e., the current flowing through the switching element) and increasing an amount of heat generated by the switching element SV1 to SV4.

For example, as shown in FIG. 5, based on the duty of the control signal provided to the first switching element SV1 being less than 35% (e.g., 30%), the first switching element SV1 may not perform zero voltage switching (ZVS) and the loss may be generated due to a reverse recovery current and the discharge loss may be generated by the first snubber capacitor CS1, thereby concentrating the heat generated by the first switching element SV1 compared to the second switching element SV2.

In the induction heating device 1, the output may be controlled as follows.

In some implementations, the control signal provided to the first switching element SV1 and the control signal provided to the second switching element SV2 may be complementary to each other. A third switching element and a fourth switching element SV4 may be controlled through the same mechanism as the first switching element SV1 and the second switching element SV2. For example, the first switching element SV1 is described.

For example, in some cases, where the duty of the control signal provided to the first switching element SV1 is adjusted between 35% to 50% when the first relay R1 electrically connects the first inverter IV1 to the first snubber capacitor CS1 and the second snubber capacitor CS2, the ZVS may be performed, and a normal state may be maintained in which the heat generation may not be concentrated on the first switching element SV1.

In some cases, where the controller reduces the duty of the control signal provided to the first switching element SV1 as well as maintaining the fixed frequency in order to reduce the output, the ZVS may not be performed in the low output section (e.g., based on the duty being less than 35%) and the discharge loss may be generated by the snubber capacitor (e.g., the first snubber capacitor CS1), thereby concentrating the heat generated by the first switching element SV1.

The controller may open the first relay R1 to electrically disconnect the first inverter IV1 from the first snubber capacitor CS1 and the second snubber capacitor CS2 to remove the discharge loss generated by the snubber capacitor (i.e., the discharge loss of the snubber capacitor generated when the switching element is turned on based on the snubber capacitor not being discharged).

That is, the controller may control the switching operation of the first relay R1 and may electrically disconnect the connection between the first inverter IV1 and the first snubber capacitor portion CSP1 to remove the discharge loss of the snubber capacitor.

In some examples, the first inverter IV1 and the second snubber capacitor CSP2 may remain electrically connected to each other regardless of the switching operation of the first relay R1, thereby reducing the surge voltage and the inrush current generated when the switching operation of the first inverter IV1 is performed.

In some examples, the controller may control the switching operation of the second relay R2 through the same method as the above-described method.

FIG. 6 show only one inverter (e.g., a first inverter IV1) among a first inverter IV1 and a second inverter IV2 operating (i.e., a first working coil WC1 being only operated).

In some implementations, where only the first inverter IV1 among the first inverter IV1 and the second inverter IV2 operates, the controller may provide the first control signal to the first inverter IV1 to control the output of the first working coil WC1. In some examples, the controller may adjust the operation frequency of the first control signal to adjust output of the first working coil WC1.

In some cases, where the second inverter IV2 may not operate while only the first inverter IV1 operates, even if the first inverter IV1 may not operate with the fixed frequency, interference noise caused by different operating frequencies from each other may not be generated.

In summary, interference noise may not be generated based on only a single inverter being operated (e.g., when a single vessel is heated).

Further, the output of the first working coil WC1 is controlled by adjusting the operating frequency of the first control signal, not by adjusting the pulse width of the first control signal, so that the discharge loss of the snubber capacitor may not be generated in the low output section.

In some implementations, where only the first inverter IV1 of the first inverter IV1 and the second inverter IV2 operates, the controller controls the switching operation of the first relay R1 to electrically connect the first inverter IV1 and the first snubber capacitor CSP1, thereby effectively reducing the surge voltage and the inrush current generated based on the switching operation of the first inverter IV1.

The controller may control the switching operation of the relay and the frequency of the control signal in various ways based on situations of the induction heating device 1. The controller may change the switching operation of the relay and the frequency of the control signal in a different manner from the method shown in FIGS. 5 and 6.

In some implementations, the induction heating device 1 may reduce the interference noise generated when the plurality of vessels are heated by controlling the pulse width at a fixed frequency without additional devices such as an LDV, thereby saving cost of the additional device, and improving user satisfaction and user convenience by removing the interference noise.

In some examples, the induction heating device 1 may prevent overheating of the switching element and implement a wide output range without an additional circuit. Continuous output may be performed over a wide output range, thereby improving product performance and reliability.

In some examples, FIG. 7 is a circuit diagram showing a zone-free type of induction heating device in FIG. 4.

That is, as shown in FIG. 7, a first semiconductor switch SS1 and a second semiconductor switch SS2 may be further electrically connected to the induction heating device 1 in FIG. 4 to turn on/turn off the first working coil WC1 and the second working coil WC2 at high speeds, and in some cases, where a plurality of working coils and semiconductor switches are provided, the zone-free type induction heating device may be provided.

In some examples, in the zone-free type induction heating device, the above-described problems may be solved through the aforementioned control method performed by the controller.

An induction heating device is described below with reference to FIGS. 8 and 9.

Figure 8:
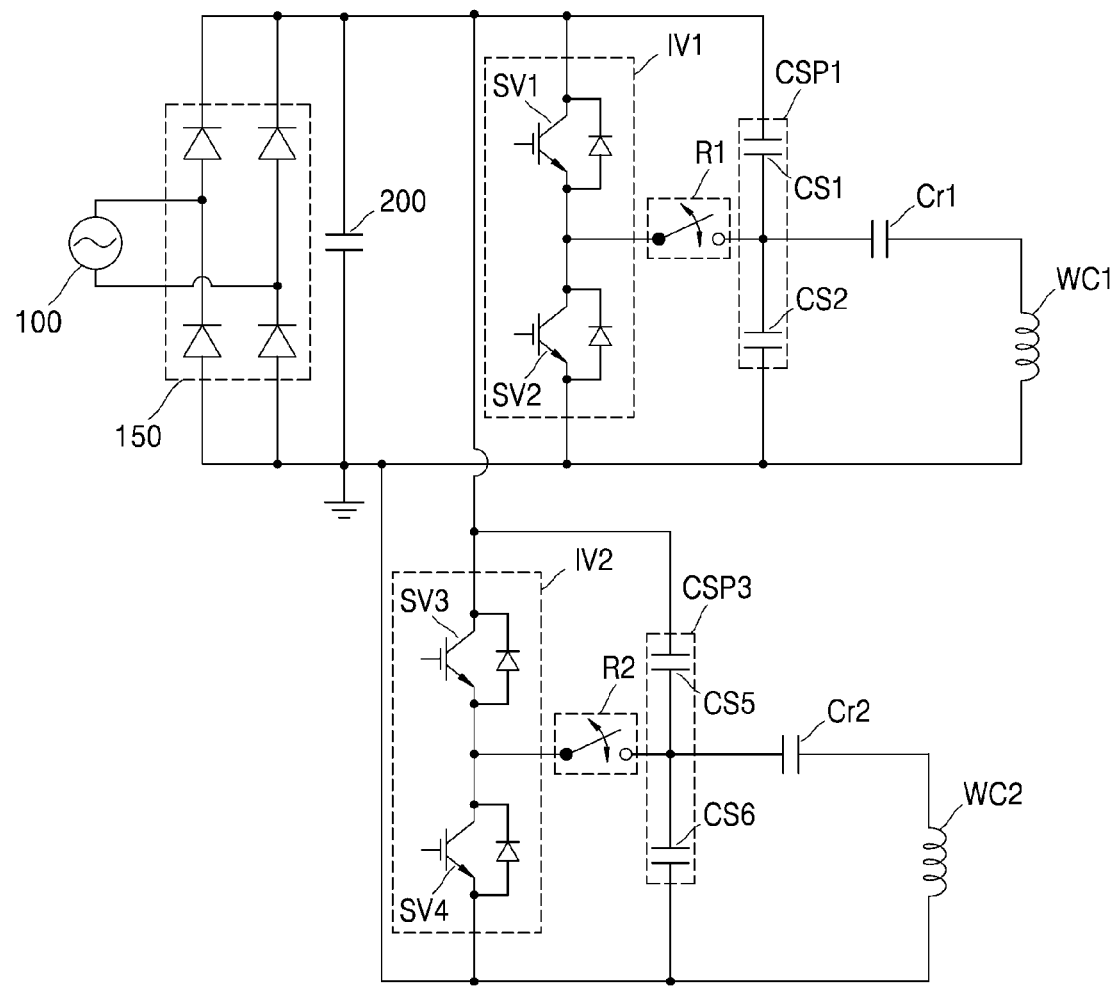
FIG. 8 is a circuit diagram showing another example of an induction heating device.

FIG. 8 is a circuit diagram showing another example of an induction heating device. FIG. 9 is a circuit diagram showing the zone-free type of the induction heating device in FIG. 8.

In some examples, the induction heating device 2 is identical to the induction heating device 1 in FIG. 4 except for some components and structures, and thus, difference between the induction heating device 2 and the induction heating device 1 is described.

Referring to FIG. 8, the induction heating device 2 may include a power supply 100, a rectifier 150, a DC link capacitor 200, and a first inverter IV1 and a second inverter IV2, a first snubber capacitor CSP1 and a third snubber capacitor CSP3, a first resonance capacitor Cr1 and a second resonance capacitor Cr2, a first working coil WC1 and a second working coil WC2, and a first relay R1 and a second relay R2.

Figure 9:
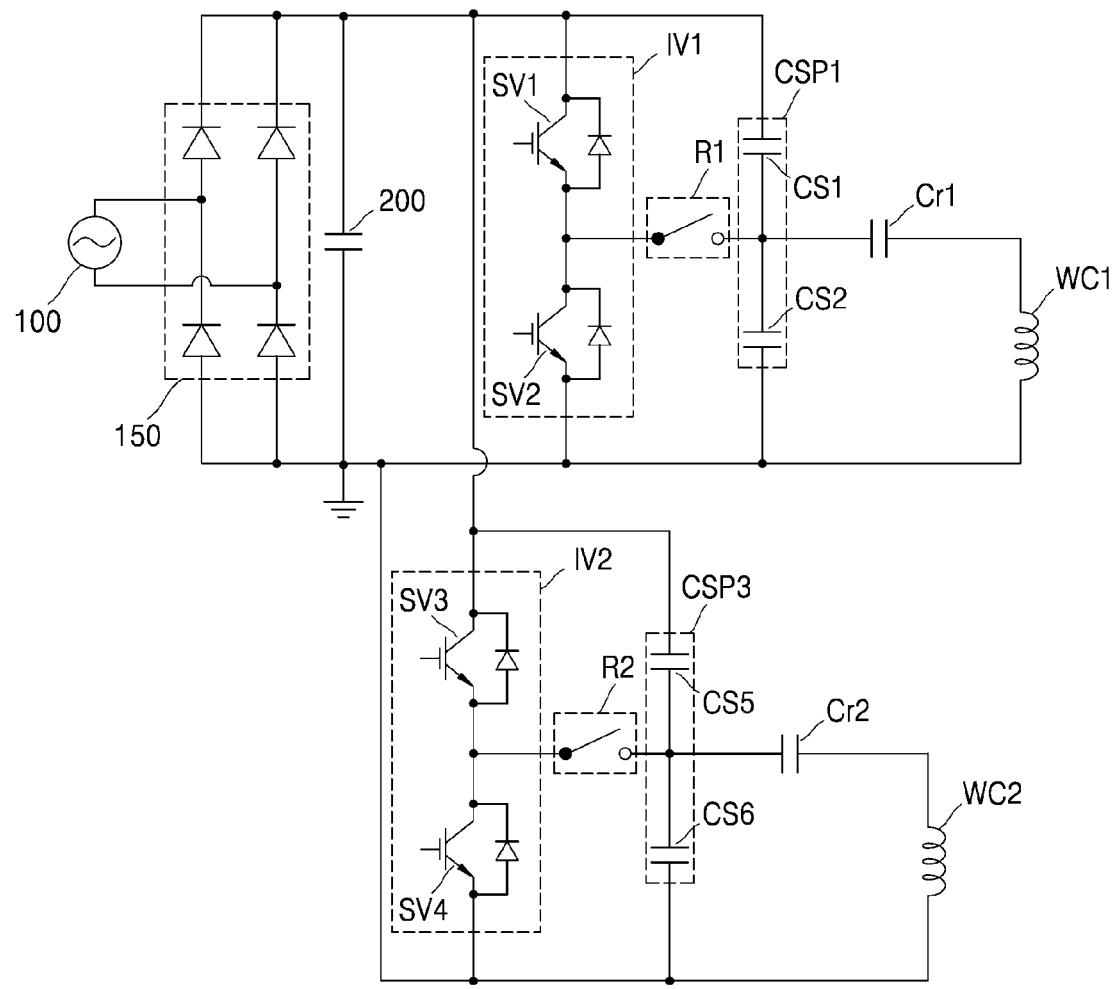
FIG. 9 is a circuit diagram showing a zone-free type induction heating device as shown in FIG. 8.

In contrast to the induction heating device 1 in FIG. 4, the induction heating device 2 in FIG. 9 may not include a second snubber capacitor portion CSP2 and a fourth snubber capacitor portion CSP4.

In some implementations, the induction heating device 2 may not include the second snubber capacitor portion CSP2 and the fourth snubber capacitor portion CSP4, thereby reducing a number of components of the induction heating device 2 compared to the number of components of the induction heating device 1 in FIG. 4 and reducing production cost thereof.

In some implementations, the induction heating device 2 operates through the same mechanism as the induction heating device 1 in FIG. 4 (i.e., a method of controlling, by a controller, the relay and a method of controlling a frequency of the control signal may be used in the same manner, as shown in FIGS. 5 and 6), thereby removing the interference noise and having a wide output range of the induction heating device 2.

In some examples, in the case of the induction heating device 2, as shown in FIG. 9, the first semiconductor switch SS1 and the second semiconductor switch SS2 are further electrically connected to the induction heating device 1 in FIG. 8 to turn on/off the first working coil WC1 and the second working coil WC2 at a high speed. In some cases, where the plurality of working coils and semiconductor switches are provided, the zone-free type induction heating device may be provided.

While the present disclosure has been described with reference to exemplary drawings thereof, it is to be understood that the present disclosure is not limited to implementations and drawings in the present disclosure, and various changes can be made by the skilled person in the art within the scope of the technical idea of the present disclosure. Although working effects obtained based on configurations of the present disclosure are not explicitly described while describing the implementations of the present disclosure, effects predictable based on the configurations have also to be recognized.

Other implementations are within the scope of the following claims.

What is claimed is:

1. An induction heating device, comprising:
   a first resonance circuit comprising a first working coil and a first resonance capacitor;
   a first inverter electrically connected to the first resonance circuit and configured to perform a first switching operation to thereby apply a first resonance current to the first working coil;
   a first group of snubber capacitors that are configured to be electrically connected to the first inverter, the first group of snubber capacitors comprising a first snubber capacitor and a second snubber capacitor;
   a first relay configured to selectively connect the first group of snubber capacitors to the first inverter; and
   a second group of snubber capacitors that are electrically connected to the first inverter, the second group of snubber capacitors comprising a third snubber capacitor and a fourth snubber capacitor that are each different from the first snubber capacitor and the second snubber capacitor.

2. The induction heating device of claim 1, wherein a capacitance value of each of the first snubber capacitor and the second snubber capacitor is greater than a capacitance value of each of the third snubber capacitor and the fourth snubber capacitor.

3. The induction heating device of claim 2, wherein the capacitance value of the first snubber capacitor is equal to the capacitance value of the second snubber capacitor, and
   wherein the capacitance value of the third snubber capacitor is equal to the capacitance value of the fourth snubber capacitor.

4. The induction heating device of claim 1, wherein the first inverter comprises a first switching element and a second switching element that are configured to perform the first switching operation,
   wherein the first snubber capacitor is configured to be electrically connected in parallel to the first switching element through the first relay,
   wherein the second snubber capacitor is configured to be electrically connected in parallel to the second switching element through the first relay, and
   wherein the third snubber capacitor is electrically connected in parallel to the first switching element, and
   wherein the fourth snubber capacitor is electrically connected in parallel to the second switching element.

5. The induction heating device of claim 4, wherein the first switching element has:
   a first end that is electrically connected to a first end of the first snubber capacitor and a first end of the third snubber capacitor; and
   a second end that is electrically connected to a first end of the second switching element, a first end of the first relay, a second end of the third snubber capacitor, and a first end of the fourth snubber capacitor,
   wherein a second end of the first relay is electrically connected to a second end of the first snubber capacitor, a first end of the second snubber capacitor, and the first resonance capacitor, and
   wherein a second end of the second snubber capacitor, a second end of the fourth snubber capacitor, and a second end of the second switching element are electrically connected to the first working coil and to a ground.

6. The induction heating device of claim 5, wherein the first resonance capacitor has a first end that is electrically connected to the second end of the first relay, and a second end that is electrically connected to the first working coil.

7. The induction heating device of claim 1, further comprising:
   a second resonance circuit comprising a second working coil that is different from the first working coil and a second resonance capacitor that is different from the first resonance capacitor;
   a second inverter electrically connected to the second resonance circuit and configured to perform a second switching operation to thereby apply a second resonance current to the second working coil;
   a rectifier that is configured to convert alternating current (AC) power supplied from a power supply into direct current (DC) power and that is configured to supply the DC power to at least one of the first inverter or the second inverter; and
   a controller that is configured to control operation of each of the first inverter, the second inverter, and the first relay,
   wherein the first inverter is configured to perform the first switching operation based on the DC power supplied by the rectifier, and the second inverter is configured to perform the second switching operation based on the DC power supplied by the rectifier.

8. The induction heating device of claim 7, wherein the controller is configured to:
   based on operating the first inverter and the second inverter simultaneously, control the first relay to block connection between the first inverter and the first group of snubber capacitors;
   based on the first relay blocking the connection between the first inverter and the first group of snubber capacitors, provide (i) a first control signal to the first inverter to thereby control a first output of the first working coil and (ii) a second control signal to the second inverter to thereby control a second output of the second working coil, wherein the first control signal and the second control signal have a same fixed frequency; and
   adjust (i) a pulse width of the first control signal to thereby control the first output of the first working coil and (ii) a pulse width of the second control signal to thereby control the second output of the second working coil.

9. The induction heating device of claim 7, wherein the controller is configured to:
based on operating only the first inverter among the first inverter and the second inverter, control the first relay to connect the first inverter and the first snubber capacitor;
based on the first relay connecting the first inverter and the first snubber capacitor to each other, provide a first control signal to the first inverter to thereby control an output of the first working coil; and
adjust a frequency of the first control signal to thereby control the output of the first working coil.

10. The induction heating device of claim 7, further comprising:
a first semiconductor switch electrically connected to the first working coil and configured to turn on and turn off the first working coil;
a second semiconductor switch electrically connected to the second working coil and configured to turn on and turn off the second working coil; and
a DC link capacitor electrically connected in parallel to the rectifier and configured to reduce variation of the DC power converted by the rectifier.

11. The induction heating device of claim 7, wherein each of the first inverter and the second inverter is a half-bridge type inverter.

12. An induction heating device comprising:
a first resonance circuit comprising a first working coil and a first resonance capacitor;
a first inverter electrically connected to the first resonance circuit and configured to perform a first switching operation to thereby apply a first resonance current to the first working coil;
a first group of snubber capacitors that are configured to be electrically connected to the first inverter, the first group of snubber capacitors comprising a first snubber capacitor and a second snubber capacitor; and
a first relay configured to selectively connect the first group of snubber capacitors to the first inverter,
wherein the first inverter comprises a first switching element and a second switching element that are configured to perform the first switching operation,
wherein the first snubber capacitor is configured to be electrically connected in parallel to the first switching element through the first relay, and
wherein the second snubber capacitor is configured to be electrically connected in parallel to the second switching element through the first relay.

13. The induction heating device of claim 12, wherein the first switching element has:
a first end that is electrically connected to a first end of the first snubber capacitor; and
a second end that is electrically connected to a first end of the second switching element and a first end of the first relay,
wherein a second end of the first relay is electrically connected to a second end of the first snubber capacitor, a first end of the second snubber capacitor, and the first resonance capacitor, and
wherein a second end of the second snubber capacitor and a second end of the second switching element are electrically connected to the first working coil and to a ground.

14. The induction heating device of claim 13, wherein the first resonance capacitor has a first end that is electrically connected to a second end of the first relay, and a second end that is electrically connected to the first working coil.

15. An induction heating device comprising:
a first resonance circuit comprising a first working coil and a first resonance capacitor;
a first inverter electrically connected to the first resonance circuit and configured to perform a first switching operation to thereby apply a first resonance current to the first working coil;
a first group of snubber capacitors that are configured to be electrically connected to the first inverter, the first group of snubber capacitors comprising a first snubber capacitor and a second snubber capacitor;
a first relay configured to selectively connect the first group of snubber capacitors to the first inverter;
a second resonance circuit comprising a second working coil that is different from the first working coil and a second resonance capacitor that is different from the first resonance capacitor;
a second inverter electrically connected to the second resonance circuit and configured to perform a second switching operation to thereby apply a second resonance current to the second working coil;
a rectifier that is configured to convert alternating current (AC) power supplied by a power supply into direct current (DC) power and that is configured to supply the DC power to at least one of the first inverter or the second inverter; and
a controller that is configured to control operation of each of the first inverter, the second inverter, and the first relay,
wherein the first inverter is configured to perform the first switching operation based on the DC power supplied by the rectifier, and the second inverter is configured to perform the second switching operation based on the DC power supplied by the rectifier.

16. The induction heating device of claim 15, wherein the controller is configured to:
based on operating the first inverter and the second inverter simultaneously, control the first relay to block connection between the first inverter and the first snubber capacitor;
based on the first relay blocking the connection between the first inverter and the first snubber capacitor, provide (i) a first control signal to the first inverter to thereby control a first output of the first working coil and (ii) a second control signal to the second inverter to thereby control a second output of the second working coil, wherein the first control signal and the second control signal have a same fixed frequency; and
adjust (i) a pulse width of the first control signal to thereby control the first output of the first working coil and (ii) a pulse width of the second control signal to thereby control the second output of the second working coil.

17. The induction heating device of claim 15, wherein the controller is configured to:
based on operating only the first inverter among the first inverter and the second inverter, control the first relay to connect the first inverter and the first snubber capacitor to each other;
based on the first relay connecting the first inverter and the first snubber capacitor to each other, provide a first control signal to the first inverter to thereby control an output of the first working coil; and
adjust a frequency of the first control signal to thereby control the output of the first working coil.

18. The induction heating device of claim 15, further comprising:
- a first semiconductor switch electrically connected to the first working coil and configured to turn on and turn off the first working coil;
- a second semiconductor switch electrically connected to the second working coil and configured to turn on and turn off the second working coil; and
- a DC link capacitor electrically connected in parallel to the rectifier and configured to reduce variation of the DC power converted by the rectifier.

19. The induction heating device of claim 15, wherein each of the first inverter and the second inverter is a half-bridge type inverter.

* * * * *